United States Patent [19]

Herenius

[11] 4,214,443
[45] Jul. 29, 1980

[54] MARINE ENGINE MANIFOLD

[75] Inventor: Frederik J. Herenius, Peterborough, England

[73] Assignee: Perkins Engines Limited, Peterborough, England

[21] Appl. No.: 939,014

[22] Filed: Sep. 1, 1978

Related U.S. Application Data

[62] Division of Ser. No. 783,353, Mar. 31, 1977.

[51] Int. Cl.² ............................................. F01N 7/06
[52] U.S. Cl. .................................. 60/321; 123/41.48; 123/547
[58] Field of Search ............... 60/321, 320; 123/41.48, 123/122 AB

[56] References Cited

U.S. PATENT DOCUMENTS

| | | | |
|---|---|---|---|
| 1,289,868 | 12/1918 | Moreland | 165/52 |
| 1,602,098 | 10/1926 | Burns | 123/119 B |
| 2,060,187 | 11/1936 | Fernstrum | 60/321 |
| 2,466,525 | 4/1949 | Wilson | 165/34 |
| 2,858,667 | 11/1958 | Reske | 60/321 |
| 3,577,727 | 5/1971 | Warren | 60/292 |

Primary Examiner—Douglas Hart
Attorney, Agent, or Firm—William R. Nolte

[57] ABSTRACT

A combined heat exchanger, exhaust and induction manifold for attachment to an internal combustion engine in which a coolant jacket wholly or partially surrounds exhaust and induction manifolds. The jacket and manifolds are integrally formed as a single casting with the requisite passages to produce a compact sub assembly easily attached to the engine thereby simplifying engine building. Engine coolant circulated through the jacket controls exhaust manifold temperature and the heat exchanger cooled by a second medium, e.g. sea water, controls, with the aid of a thermostatic valve, the temperature of the engine coolant. Provision is made for mounting an exhaust driven turbocharger on the manifold at the outlet of the exhaust manifold.

5 Claims, 20 Drawing Figures

AIR
ENGINE COOLANT
BY PASS
SEA WATER
EXHAUST GAS

MARINE ENGINE MANIFOLD

This is a division, of application Ser. No. 783,353, filed Mar. 31, 1977.

This invention relates to exhaust and induction manifolds and more particularly to such manifolds for use with marine engines.

With the increasing sophistication of such engines, a considerable amount of ancilliary equipment for the heating or cooling of various fluids involved in the operation of an engine has been evolved and much of such equipment are individual components which are separately fixed to the engine block and involve the provision of inter-connecting pipe work operations which are expensive in terms of cost and labour.

Exhaust manifolds on these engines are prone to suffer cracking due to the high temperatures to which the manifolds may be exposed in service, and water cooling of the manifolds has been proposed. This leads to additional cooling arrangements which further complicate assembly problems.

The present invention seeks to provide a construction which will provide cooling for the exhaust manifold and simplify the problems associated with assembly.

According to the present invention there is provided a manifold comprising a body adapted to be secured to an internal combustion engine having exhaust and induction ports, said body including integrally formed induction and exhaust manifolds having induction and exhaust ducts connectible to said ports, and having integrally formed walls defining a coolant jacket wholly or partially surrounding the ducts and means for connecting the coolant jacket to a source of liquid coolant.

The manifold according to the invention also includes heat exchange means within the coolant jacket said heat exchange means providing an inlet passage for coolant flowing between means for connecting the coolant jacket to a coolant outlet of the engine and that portion of the coolant jacket surrounding the exhaust duct.

Preferably, an upper portion of the coolant jacket is arranged to function as a header for that portion of the coolant jacket surrounding the exhaust duct. The heat exchange means preferably is located in that portion of the coolant jacket which functions as a header for the portion of the coolant jacket surrounding the exhaust duct.

Preferably, the induction duct is at least partially insulated from the cooling jacket in order to avoid heating the charge air by heat transfer from coolant which has extracted heat from the exhaust duct. Insulation can be achieved by providing a cavity wall between the coolant and the air in the duct, the cavity wall being open to the atmosphere.

The exhaust duct is also preferably to be at least partially insulated from the coolant in order to prevent too much exhaust energy, which is used for driving a turbocharger, being lost to the coolant. An air gap can therefore be provided over at least part of the exhaust duct by means of a cavity wall which may be in the form of cast in heat resistant metal hollow inserts forming at least part of the wall of the exhaust duct. Ceramic fibre insulation may also be used inside the duct.

In another modification, the exhaust duct may include one or more portions of heat resistant metal such as stainless steel tube cast-in during manufacture. Preferably such inserts are confined to straight portions of the duct.

Preferably the manifold construction is a single casting of an aluminium alloy comprising a header having a common, apertured, wall with an adjacent coolant jacket surrounding integrally formed exhaust ducts, the header also having common walls with an integral induction manifold duct and optionally a by-pass duct, and including integrally formed support members for a heat exchange means extending longitudinally in the header tank.

The invention also provides a marine engine incorporating a manifold connected to exhaust and induction ports of an internal combustion engine, and having engine coolant conduits connecting the thermostatically controlled valve and the coolant jacket of the manifold to a coolant inlet and outlet of the engine, a conduit for a second coolant connecting an inlet of the heat exchanger of the manifold to an outlet of cooling means of a charge air cooler, a conduit for connecting an inlet of the cooling means to a second coolant supply, a return conduit connecting an outlet of the heat exchanger to the second coolant supply, an exhaust driven turbocharger mounted on the exhaust outlet of the manifold, a first air conduit connecting an air outlet of the turbocharger to an air inlet of charge air cooler and a second air conduit connecting an air outlet of the charge air cooler to the induction inlet of the manifold.

The heat exchange means is preferably a tube bundle within a cylindrical casing the interior of which communicates with an inlet for receiving engine coolant from the cylinder block, the tube bundle and its associated flow passages and connections being arranged to pass a liquid cooling medium in one direction through the tubes of one half of the bundle and to return the liquid cooling medium through the tubes of the other half of the bundle, and being connectible to a source of liquid cooling medium separate from the engine coolant. Tube and tube plate heat exchangers are well known and it is preferred in the present invention to lengthen the path followed by the engine coolant in travelling longitudinally through the cylindrical space around the tubes by providing semicircular spaced baffles alternately located on either side of a central longitudinal plane in the interior of the cylindrical casing whereby the coolant is constrained to follow a circuitous path.

Preferably the manifold is equipped with a double acting thermostatically controlled valve operable in response to the temperature of the engine coolant to close the coolant inlet to the heat exchanger and to open the cooling inlet to the by-pass duct in the header when coolant is at ambient temperature and at a given temperature above ambient to open the coolant inlet to the heat exchanger and to close the coolant inlet to the by-pass duct.

The manifold can be constructed without a by-pass for the heat exchanger in which case arrangements are provided for the coolant passing through the thermostatically controlled valve to be directed into the coolant return when the coolant is at ambient temperature. This involves providing a duct communicating with the thermostatically controlled valve and the coolant return instead of a duct communicating with a by-pass.

The outlets from the exhaust ducts within the manifold may terminate in a common face with inlet and outlet ports communicating with the interior of the coolant jacket surrounding the exhaust ducts and thereby provide means by which connection can be made between the manifold and complementary inlets and outlets of an exhaust gas-driven turbine of a turbocharger and coolant therefor. The turbine drives an air compressor for the combustion air charge, and the coolant leaves the turbine and passes back into the coolant jacket surrounding the exhaust ducts and is discharged into a transfer pipe for recirculation in the cylinder block.

The separate source of liquid cooling medium which circulates through the heat exchanger tube bundle is, usually in the case of a marine engine, sea water. For land based installations the cooling medium obviously can be taken from another source. The liquid cooling medium is conveniently abstracted by means of a pump and passed first through engine oil and gear box oil coolers and a charge air cooler receiving air from the compressor, and is then circulated through the heat exchanger tube bundle before being discharged.

The invention provides a compact sub-assembly which can be bolted on the cylinder block in place of the conventional, separate induction and exhaust manifolds, and the connections to coolant and cooling medium and to the turbocharger are easily made. By using aluminium alloy for the casting, made possible by water cooling the exhaust duct, weight saving is achieved, and by using a single casting containing all the necessary passages the height and bulk are kept to a minimum. Further, the manifold provides a convenient mounting for the turbocharger. Such factors make it possible to design an aesthetically pleasing component which can be easily attached to an engine block thereby achieving significant time and cost savings.

An example of the manifold in accordance with the invention is illustrated in the accompanying drawings of which

Referring to the drawings, FIGS. 1-5 show a 6-cylinder diesel engine with a manifold 1 located alongside a cylinder head 2 above a cylinder block 3 which carries at one end a flywheel cover 4 and gear box 5 and at the other end ancilliary equipment such as a generator 6. A fuel system illustrated in FIG. 2 consists of a fuel pump 7, a fuel filters 8 (see FIG. 5), and injection pump 9 (FIG. 5) and associated pipework.

Figure 1:
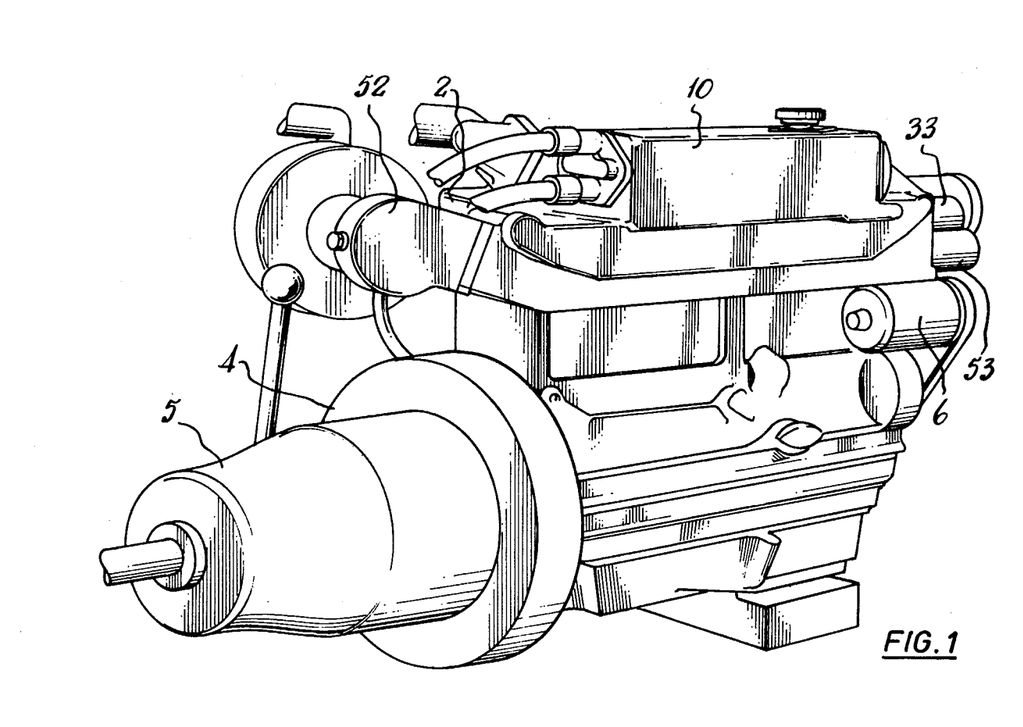
FIG. 1 is a perspective view of an engine fitted with the manifold.
Figure 2:
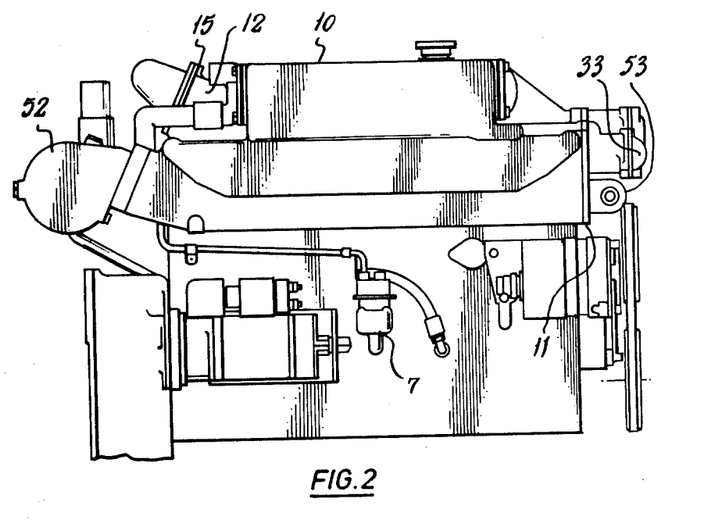
FIG. 2 is a side elevation of the engine of FIG. 1 showing the location of the manifold relative to other components of the engine.
Figure 3:
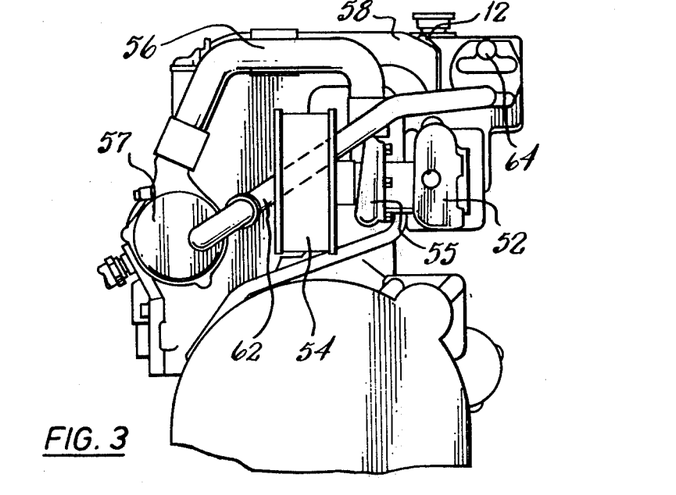
FIG. 3 is an end elevation of the engine viewed from the flywheel end.
Figure 4:
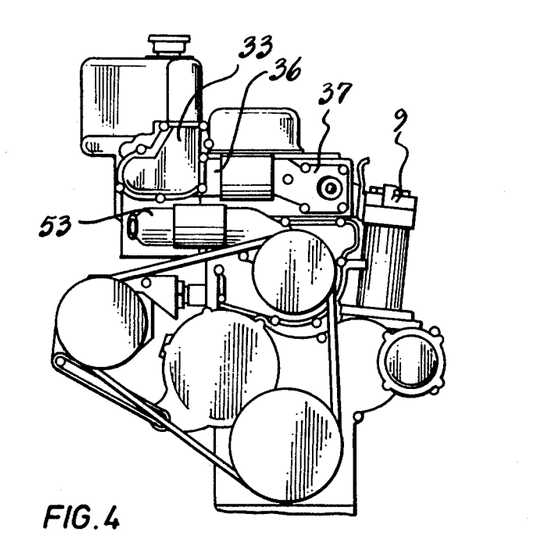
FIG. 4 is an end elevation of the engine viewed from the end opposite to that shown in FIG. 3.
Figure 5:
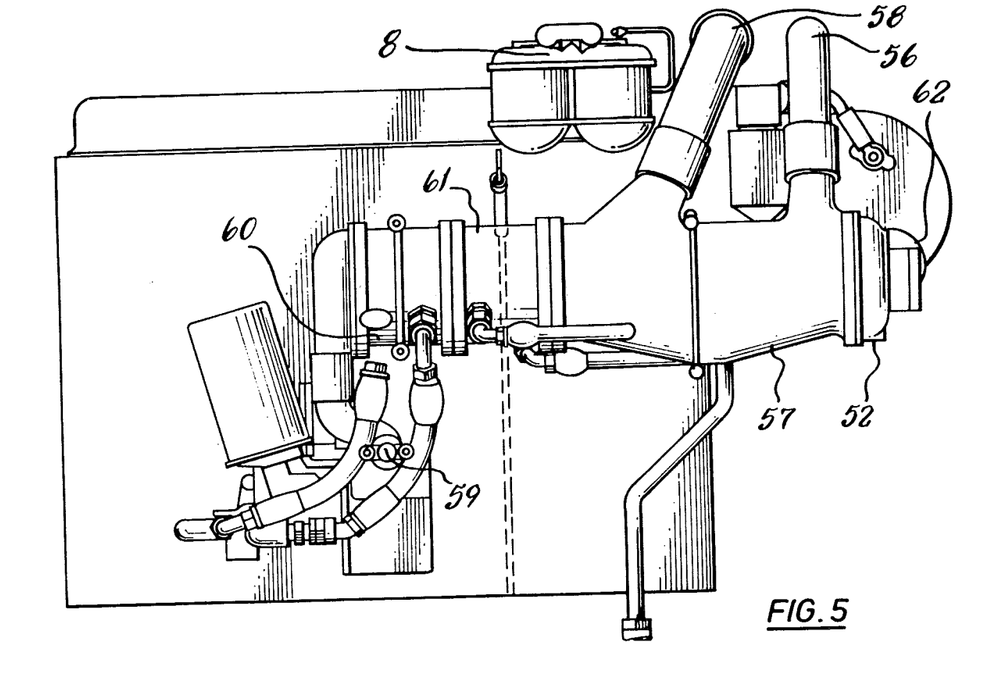
FIG. 5 is a side elevation of the engine viewed from the side opposite to that shown in FIG. 2.
Figures 6, 10:
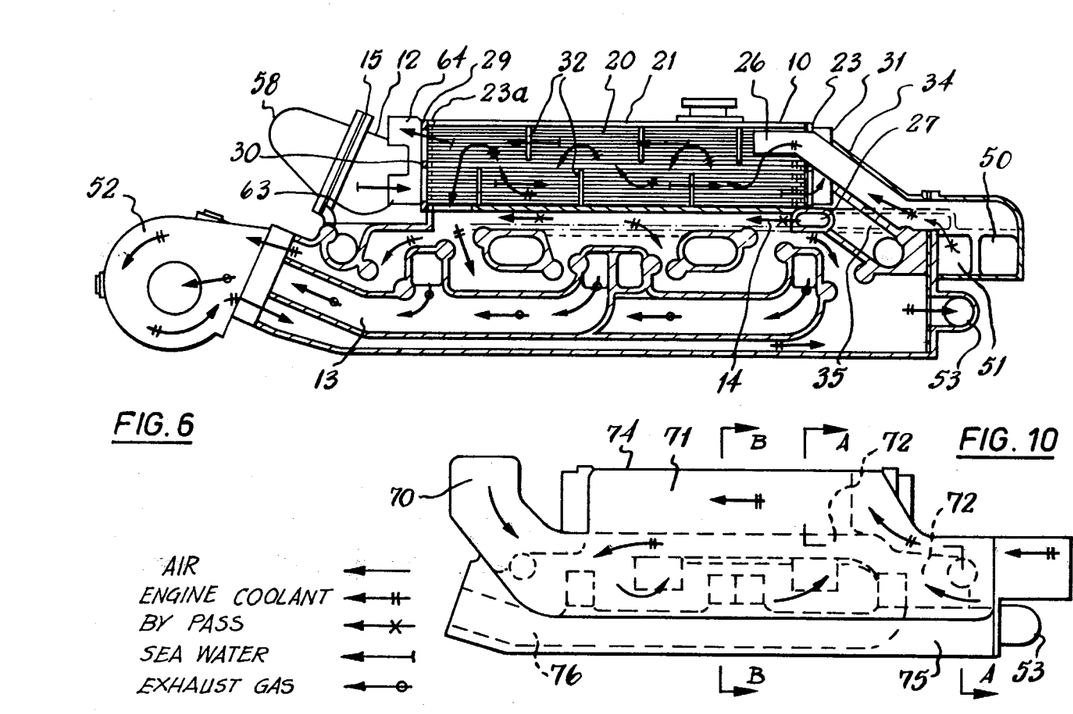
FIG. 6 is a diagrammatic view of the flow of engine coolant and exhaust gases through the manifold showing the arrangement of the various passageways within the manifold.
FIG. 10 is a side elevation of a manifold showing an alternative arrangement of the induction manifold.

The manifold 1 is an integral casting consisting of a header 10, a coolant jacket 11, and induction manifold 12, an exhaust manifold 13 and a by-pass 14 as illustrated in FIG. 6. The induction manifold 12 terminates in an inlet port 15 for connection to an air supply and the exhaust manifold 13 is provided with a multi-channel port 16 which contains an engine coolant outlets 17 and inlets 18 and exhaust outlets 19. In the preferred arrangement, the induction manifold 12 is located adjacent the engine.

Within the header 10 and extending throughout its length is a heat exchanger 20 consisting of a tubular casing 21 defining a flow passage for engine coolant and a tube bundle 22 secured at one end in a tube plane 23, and at the other, in tube plate 23a. Support members 24 and 25 formed integrally in the header casting are machined to accept the tubular casing 21 which is welded in position. A side inlet 26 for engine coolant is provided at one end of the header 10 and a by-pass inlet 27 is located in proximity to the side inlet.

At the opposite end of the header 10 is an inlet and outlet connection 28 providing communication between a source of a second liquid cooling medium and the interior of the tubes constituting tube bundle 22 by way of tube plate 23a and being sealingly secured to the end wall 29 at the header 10. The tubular casing 21 is sealingly secured within the end wall 29 and the tube plate 23a sealed in the tubular casing 21 so as to prevent leakage of liquid cooling medium into the space around the tubular bundle 22. A partition 30 extending diametrically across the tube plate 23a separates inlet and outlet flow streams to and from the tube bundle 22.

At the other end of the header 10, the tubular casing 21 sealingly engages the tube plate 23 which is externally closed by a transfer box 31. Flow of cooling medium from the inlet and outlet connection 28 is first through the lower half of the tube bundle 22 into the transfer box 31 whence it returns through the upper tube bundle 22 as shown in FIG. 6. Staggered baffles 32, spaced along the tube bundle 22 extend alternately to the centre line of the tube bundle 22 to provide circuitous flow path for engine coolant.

Figure 13:
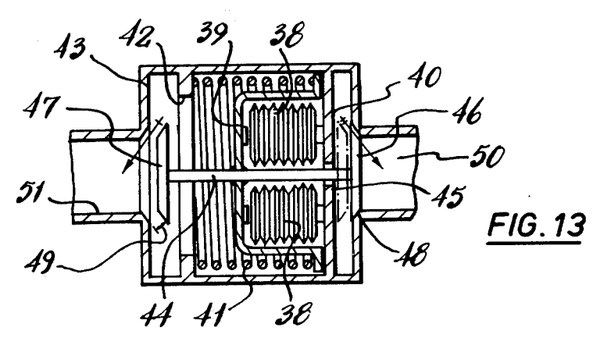
FIG. 13 is a diagrammatic view of a double acting thermostatically controlled valve regulating the flow of engine coolant into the header tank.

A double acting thermostatically controlled valve 33 communicates with the side inlet 26 by means of a duct 34 and with the by-pass inlet 27 through a by-pass duct 35, an inlet 36 being provided for connection to the cylinder block coolant outlet 37. The valve, as shown in FIG. 13, comprises a pair of thermostat bellows 38 compressed between a bell 39 and a base member 40, rigidly located within the housing 43, by spring 41 bearing on the rim of bell 39 and an annular stop member 42 within the housing 43. A centrally located stem 44 extends on either side of the bell 39 and passes through an aperture 45 in the base member 40. At each end of the stem 44 is secured valve closure members 46 and 47 respectively engageable with valve seats 48 and 49 which respectively are located at full flow outlet 50 and by-pass outlet 51. In the position shown in FIG. 13 the full flow outlet 50 is closed by the closure member 46 under the action of the spring whilst the by-pass outlet 51 is open, thus indicating cold starting conditions, when engine coolant can enter the by-pass en route to the coolant jacket 11. When the temperature of the engine coolant is high enough thermally induced expansion of the bellows 38 imparts leftwards movement to the stem 44 until the valve closure 47 seats on the valve seat 49 and the valve closure 46 is fully withdrawn from the valve seat 48. The by-pass outlet 51 is then closed and engine coolant is directed through the full flow outlet 50 en route to the heat exchanger 20.

The manifold assembly as so far described is arranged to be substituted for the conventional induction and exhaust manifolds and ancilliary engine coolant heat transfer device and is provided with suitable adaptors and connectors for connection to sources of supply of air, engine coolant, heat exchanger coolant and to an exhaust operated turbine.

The general operation of the manifold will now be described with reference to FIGS. 2, 3, 4, 5, 6 and 7. Commencing with the engine coolant flowing from the outlet 37 through the inlet 36 and the thermostatically controlled valve 33, the coolant, when cold enters the by-pass 14 and passes into the coolant jacket 11, and when hot enters the side inlet 26 via the duct 34 and passes into the heat exchanger 20. The coolant follows a circuitous path passing over the tube bundle 22 and between the baffles 32 where it is cooled, and into the header 10 from which it passes into the coolant jacket 11 around the induction inlet and exhaust outlet ports of the cylinder block 3. The coolant then extracts heat from the exhaust manifold 13 and flows out of the coolant outlets 17 into the turbine of turbocharger 52 to effect cooling of the turbine and is returned via the inlet 18 to the coolant jacket through which it passes to the return outlet 53 to the cylinder block 3.

Considering now the exhaust, the hot gases pass out of the engine into the exhaust manifold 13 and from there via outlets 19 into the turbine of the turbocharger 52 whence the gases pass into the atmosphere.

Figure 7:
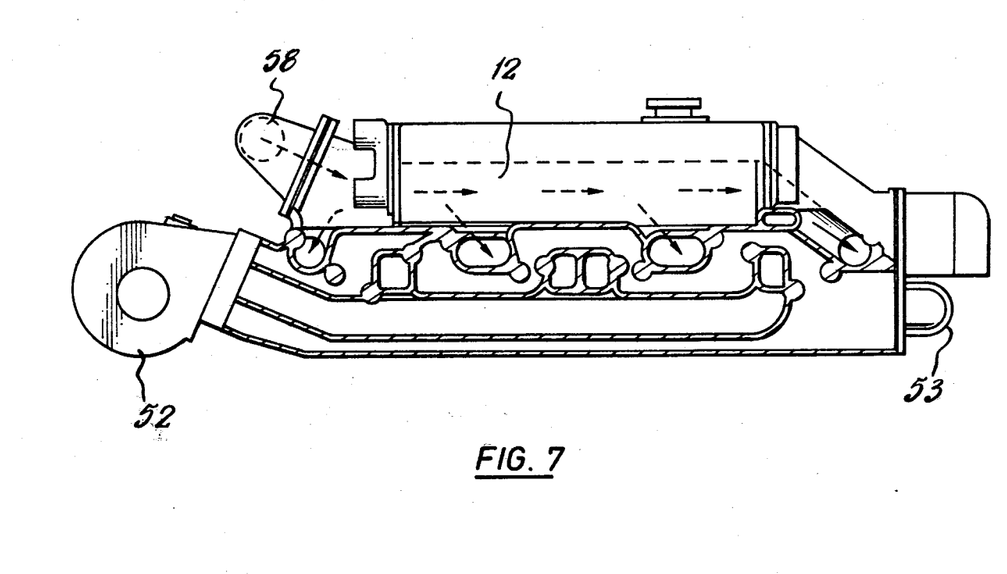
FIG. 7 is a diagrammatic view of the flow of air through the manifold for combustion in the engine.

Air for combustion is drawn through the air filter 54 by the compressor 55 driven by turbine 52 and delivered through the air transfer pipe 56 to the charge air cooler 57 and after cooling is passed through a second air transfer pipe 58 into the induction manifold 12 from which it enters the cylinders.

In the embodiment now being considered, the liquid cooling medium used to cool the heat exchanger 20 is sea water and this is drawn in by a pump (not shown) through the sea water inlet 59 (see FIG. 5) and is passed first through the engine oil cooler 60, then through the gear box oil cooler 61 into the charge air cooler 57. From the charge air cooler 57 the sea water passes through the pipe 62 into the heat exchanger 20 through the inlet 63 into the tubes forming the lower half of the tube bundle 22, its direction is reversed in the transfer box 31 to pass through the tubes forming the upper half of the tube bundle 22 from which it is discharged through the outlet 64 to a discharge pipe (not shown).

The paths taken by the engine coolant (in the present example, fresh water) combustion air, exhaust gases and sea water through the manifold can be seen diagrammatically in FIGS. 6 and 7 in which distinctive arrows are used to indicate the paths of the various fluid involved.

Figure 8:
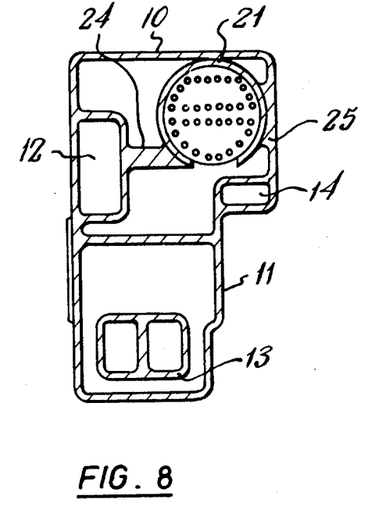
FIG. 8 is an enlarged cross sectional view of the manifold showing the preferred location of passages.
Figure 9:
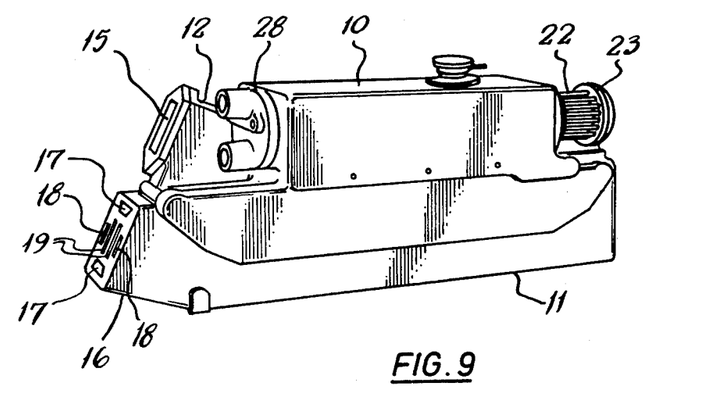
FIG. 9 is a perspective view of the manifold showing the heat exchanger partly withdrawn.
Figure 11:
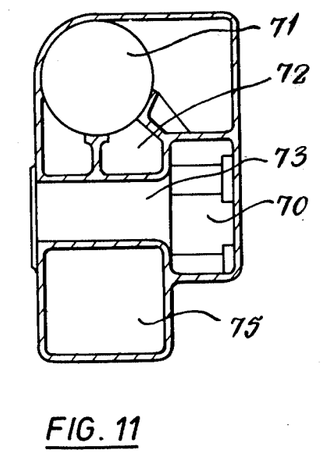
FIG. 11 is a cross section on the line AA of FIG. 10.
Figure 12:
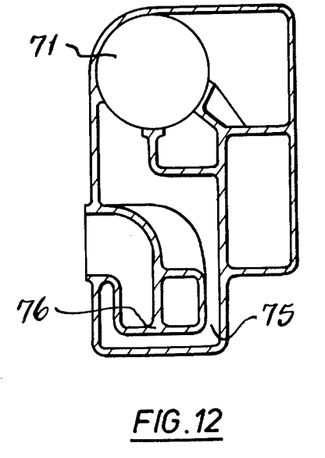
FIG. 12 is a cross section on the line BB of FIG. 10.

An alternative arrangement of the manifold is shown in FIGS. 10, 11 and 12. In this arrangement, the induction manifold 70 is located on the side remote from the engine whilst the heat exchanger 71 is located on the side nearest the engine. This is the reverse of the arrangement shown in FIG. 8. In consequence, the by-pass 72 is located between the heat exchanger 71 and the induction manifold 70 and the ducts 73 extend through the coolant jacket and have a larger cooled surface than is the case of FIG. 8, and the cross section shape of the header 74 is different. The coolant jacket 75 for the exhaust manifold 76 is substantially the same as that in FIG. 8. The by-pass 72 also takes a somewhat different path on entry into the manifold.

In another embodiment of the invention, the by-pass 14 of FIG. 6 is absent in order that the coolant flow to the coolant jacket 11 can be stopped when the engine is starting up from cold and directed into the coolant return to the engine. The thermostatically controlled valve 33 directs flow into the heat exchanger when the coolant is hot or into the return when the coolant is cold.

Figure 14:
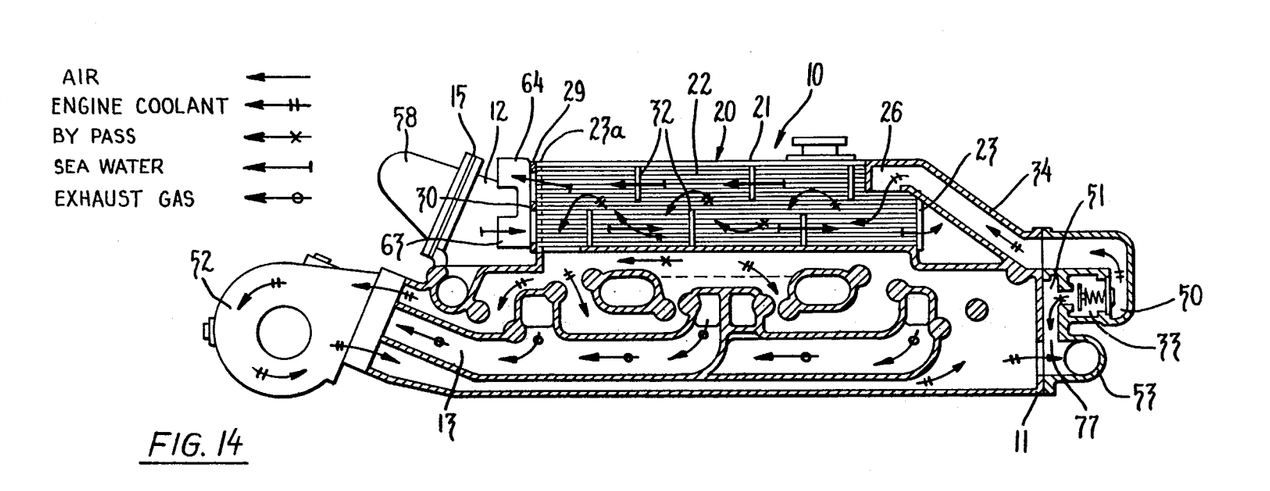
FIG. 14 is a diagrammatic view of the manifold similar to that of FIG. 6 showing an embodiment in which the by-pass duct of FIG. 6 is absent.

The arrangement is illustrated in FIG. 14 in which the outlet 51 from the thermostatically controlled valve 33 is connected to the return 53 by a passage 77. Full flow outlet 50 is connected to the heat exchanger as in FIG. 6. In operation, the valve 33 is actuated in a similar manner to that already described, the flow outlet 50 being closed by engagement of closure member 46 with seat 48 under cold starting conditions and opening when the coolant temperature is sufficiently high. Whilst outlet 50 is closed, closure member 47 is withdrawn from the seat 49 and coolant flows through outlet 51 and passage 77 to the return 53 and so back to the engine. Opening of the outlet 50 occurs simultaneously as closing of the outlet 51 and the flow of coolant is thus diverted into the heat exchanger.

Figure 15:
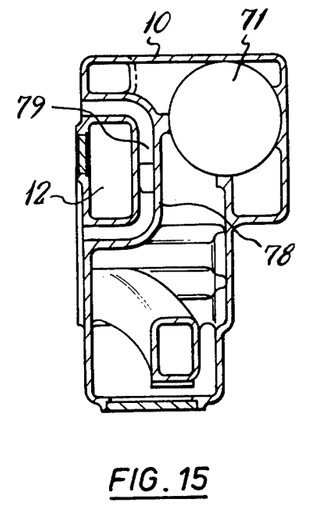
FIG. 15 is a cross section of the induction manifold of FIG. 14 showing an air gap or cavity wall to provide insulation from the coolant jacket.
Figures 16, 17:
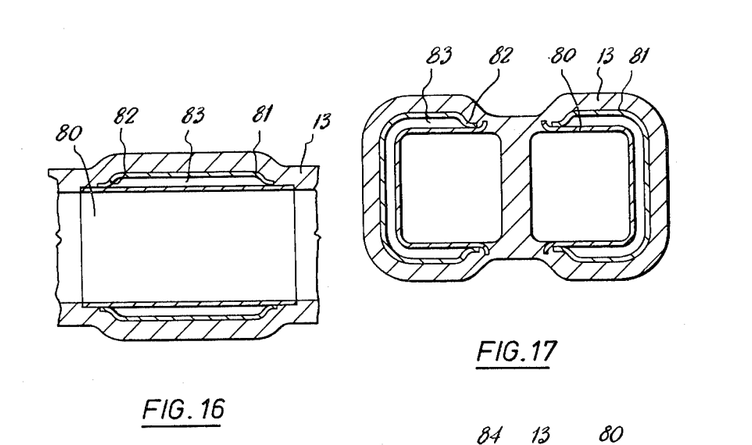
FIG. 16 is a longitudinal cross section of an exhaust manifold provided with a hollow insert to provide insulation from the coolant.
FIG. 17 is a transverse cross section of an exhaust manifold provided with a hollow insert.
Figure 18:
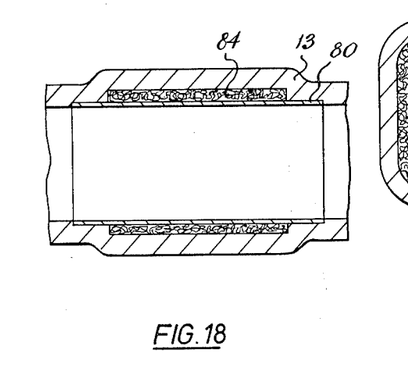
FIG. 18 is a longitudinal cross section of an exhaust manifold provided with an insulating lining.
Figure 19:
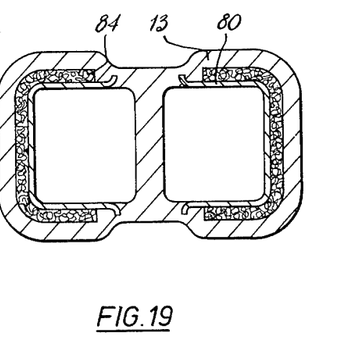
FIG. 19 is a transverse cross section of an exhaust manifold 18.
Figure 20:
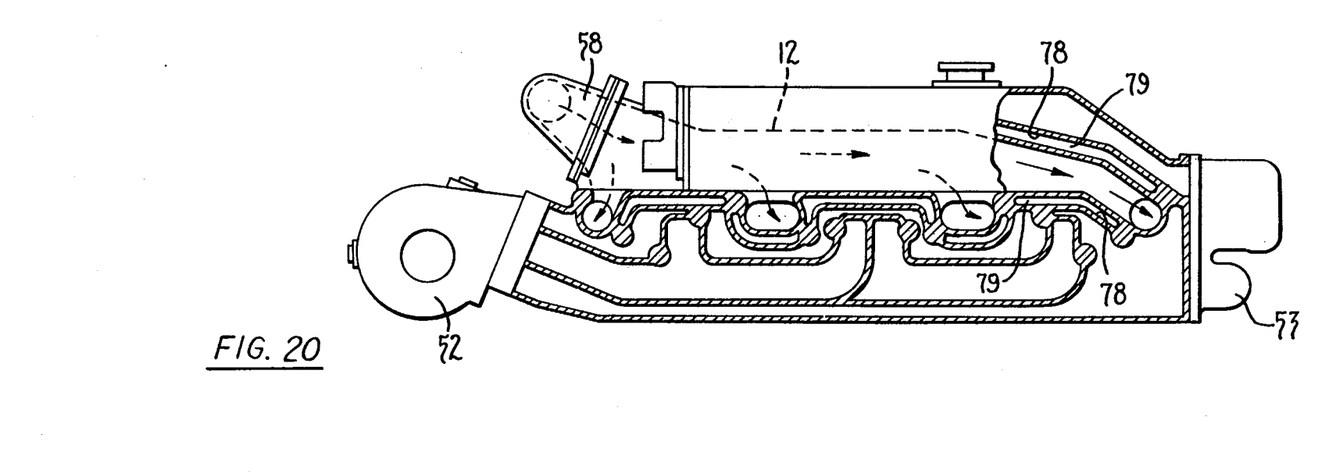
FIG. 20 is a diagramatic view of the manifold similar to that of FIG. 7 showing an embodiment in which the air gap or cavity wall of FIG. 15 is included.

In a further embodiment, particularly where the coolant temperature is higher than the temperature of the air in the induction manifold, an air gap is provided around the induction ducts. This embodiment is illustrated in FIG. 15 in which the induction manifold 12 is separated from the header 10 by an air gap 79 contained in the cavity wall 78.

Heat extraction from the exhaust manifold is modified in a still further embodiment by the provision of insulation. Two variations are shown in FIGS. 16, 17, 18 and 19. In the exhaust manifold 13, a stainless steel insert comprising an inner portion 80 and an outer portion 81 having inwardly flanged ends 82 form a cavity 83 therebetween whereby heat transfer is reduced. The insert is assembled on a core and the metal cast around it. A ceramic fiber insert 84 in another variation, is placed around an inner stainless steel insert 80 and cast in the manifold 13 in similar manner to that described above.

What we claim is:

1. A manifold comprising a body connectible to exhaust and induction parts of an internal combustion engine, an induction manifold and an exhaust manifold respectively comprising an induction duct and an exhaust duct formed integrally with said body, means for connecting said ducts respectively to said parts, walls integrally formed with said body enclosing said ducts and defining a coolant jacket including a lower portion surrounding said ducts, means for connecting said coolant jacket to a source of liquid coolant including a coolant outlet of said engine, header walls formed integrally with said body to create an upper portion of said coolant jacket defining a header above the lower portion, heat exchange means located in said header, said heat exchange means forming an inlet passage for engine coolant flowing from said source, and a double acting thermostatically controlled valve operable in response to the temperature of said engine coolant, said valve including a first valve seat and a first valve closure controlling access of said engine coolant to said heat exchanger and a second valve seat and a second valve closure controlling access of said engine coolant to a duct for returning said engine coolant to said engine, and means responsive to said engine coolant temperature to move said first valve closure into engagement with said first valve seat at ambient temperature of said engine coolant, and to move said second valve closure into engagement with said second valve seat at a predetermined temperature above ambient of said engine coolant.

2. A manifold according to claim 1 wherein the said heat exchange means comprises a tube and tube plate heat exchanger and a casing enclosing said heat exchanger, said casing including an inlet connectible to a first source of liquid coolant and at least one outlet for directing said coolant into said coolant jacket.

3. A manifold according to claim 2 wherein said heat exchanger comprises a plurality of tubes secured in parallel spaced relationship in a pair of tube plates, inlet and outlet means connectible with a second source of liquid coolant for directing the second liquid coolant in one direction through a group of tubes comprising one half of said tubes and in an opposite direction through a group of tubes comprising a second half of said tubes.

4. A manifold according to claim 1 wherein said duct for returning said engine coolant is a bypass duct for directing coolant into said jacket.

5. A manifold comprising a body connectible to exhaust and induction parts of an internal combustion engine, an induction manifold and an exhaust manifold respectively comprising an induction duct and an exhaust duct formed integrally with said body, means for connecting said ducts respectively to said parts, walls integrally formed with said body enclosing said ducts and defining a coolant jacket including a lower portion surrounding said ducts, means for connecting said coolant jacket to a source of liquid coolant including a coolant outlet of said engine, header walls formed integrally with said body to create an upper portion of said coolant jacket defining a header above the lower portion, heat exchange means located in said header, said heat exchange means forming an inlet passage for engine coolant flowing from said source, said heat exchange means including a tube and tube plate heat exchanger and a casing enclosing said heat exchange, said casing including an inlet connectible to a first source of liquid coolant and at least one outlet for directing said coolant into said coolant jacket, said tubes secured in parallel spaced relationship in a pair of tube plates, inlet and outlet means connectible with a second source of liquid coolant for directing the second liquid coolant in one direction through a group of tubes comprising one half of said tubes and in an opposite direction through a group of tubes comprising a second half of said tubes, said second source of liquid coolant being sea water.

* * * * *